March 26, 1946.    J. J. NEFF    2,397,196
MEASURING INSTRUMENT
Filed Sept. 6, 1943    3 Sheets-Sheet 1

INVENTOR.
JOSEPH J. NEFF
BY
Frank H. Harmon
ATTORNEY

March 26, 1946.        J. J. NEFF        2,397,196
MEASURING INSTRUMENT
Filed Sept. 6, 1943        3 Sheets-Sheet 2

INVENTOR.
JOSEPH J. NEFF
BY Frank H. Harmon
ATTORNEY

March 26, 1946.   J. J. NEFF   2,397,196
MEASURING INSTRUMENT
Filed Sept. 6, 1943   3 Sheets-Sheet 3

INVENTOR.
JOSEPH J. NEFF
BY
Frank H. Harmon
ATTORNEY

Patented Mar. 26, 1946

2,397,196

UNITED STATES PATENT OFFICE 2,397,196

MEASURING INSTRUMENT

Joseph J. Neff, South Euclid, Ohio, assignor, by mesne assignments, to Jack & Heintz, Inc., Cleveland, Ohio, a corporation of Ohio Application September 6, 1943, Serial No. 501,402

7 Claims. (Cl. 33—178)

This invention relates to an electrical measuring instrument, and its primary object is to provide an instrument capable of precision measurement of the inside diameter of annular surfaces.

A more specific object of the invention is to provide an electrical measuring instrument for locating and for measuring the major inside diameters of ball bearing races.

With these and other objects in view, the invention resides in the combination of parts and in the details of construction and operation hereinafter set forth in the following specification and appended claims, certain embodiments thereof being illustrated in the accompanying drawings in which:

Figure 1:
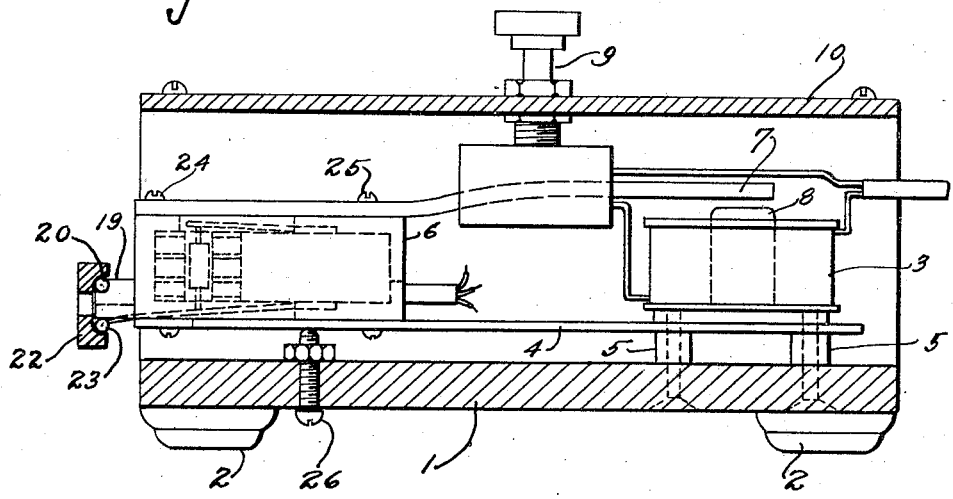
Figure 1 is a sectional view of the instrument in side elevation taken on the line 1—1 in Figure 2 and shows the carrying frame and the work in section.
Figure 2:
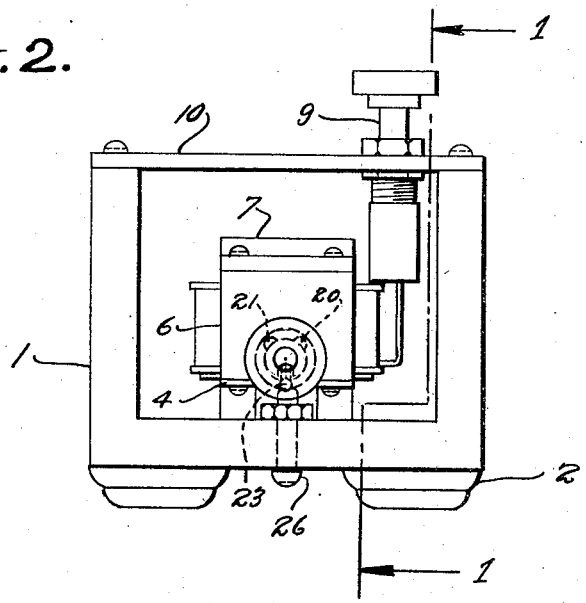
Figure 2 is a view in front elevation of the instrument.
Figure 3:
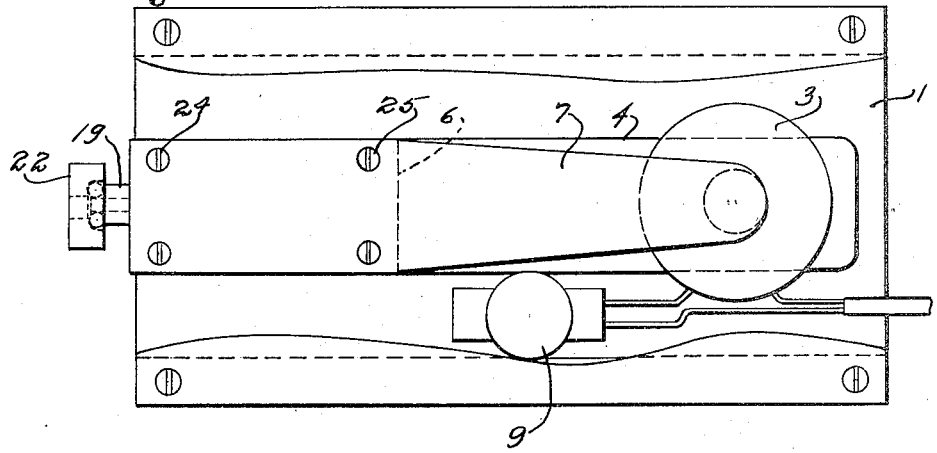
Figure 3 is a plan view of the instrument showing the lid of the casing cut away.

Referring more particularly to Figure 1, the assembly includes a frame 1 supported by feet 2, an electromagnet 3 supported on a spring arm 4 which, by means of legs 5, is fixed at one end to the base 1, a displacement pickup mechanism 6 mounted on the free end of the spring arm 4, a vibrator arm 7 mounted on the displacement pickup mechanism extending into close proximity with the armature 8 of the magnet 3, and a push button switch 9, mounted on the cover plate 10 of the frame 1.

Figure 5:
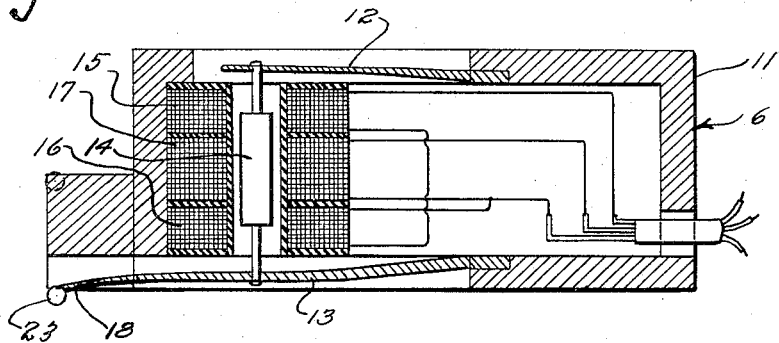
Figure 5 is an enlarged sectional view in side elevation of the displacement pickup mechanism.

The displacement pickup mechanism 6, as shown in Figure 5, consists of a frame 11, two spring arms 12 and 13 mounted on opposite sides of the frame, an armature 14 carried by the free ends of the spring arms 12 and 13, two pickup coils 15 and 16, and a driving coil 17, all mounted on this same core so as to permit armature 14 to be located centrally within them, and a stylus 18 mounted on the end of extended spring arm 13.

Figure 4:
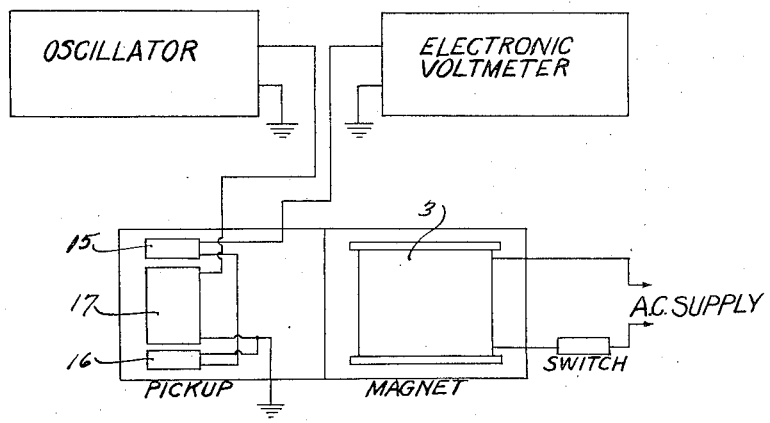
Figure 4 is a block diagram of the electrical circuits of the instrument.

The driving coil 17 receives a signal from the oscillator shown in block form in Figure 4. The pickup coils 15 and 16 which are shown mounted on opposite sides of the driving coil are connected so that the voltages induced in them by driving coil 17 oppose each other. Armature 14 is mounted so that when there is no deflection of either spring arm 12 or 13 from their normal positions, the voltages inducted in the pickup coils are exactly equal and opposite. When the armature is in this position it is said to be in the electrical center of the three coils. A displacement of the armature 14 from its electrical center causes a shift in the magnetic field, created by driving coil 17, in the direction of the displacement of armature 14. A shift of the magnetic field causes more lines of force to cut one coil than the other and consequently more voltage to be induced in one coil than in the other. The arising differential in voltage is measured by an electronic voltmeter such as shown in block form in Figure 4.

Fixed to the left extremity of the displacement pickup mechanism 6 in Figure 1 is a stud 19 carrying two work-holding balls 20 and 21. These ball work-holders are located in a vertical plane formed by themselves and stylus ball 23.

In measuring the diameter of a circular piece of work, it is necessary to make several measurements in order to determine the trueness of diameter and to find the absolute major diameter. This is necessary since no finishing operation on a circular piece of work will give an absolutely true circular surface.

This invention overcomes the necessity of making more than one precision measurement of a piece of work to find its major inside diameter. A piece of work 22 is placed in the position shown in Figure 1 on work holders 20 and 21 and stylus 23. The push button switch 9 is closed causing the electro-magnet 3 to become energized and de-energized at a rate determined by the frequency of the alternating current used to energize the coil. The armature 8 of the electromagnet 3 pulls vibrator arm 7 out of its normal position by magnetic attraction at the same rate as the coil of the magnet becomes energized and de-energized. The displacement pickup mechanism 6 is also vibrated at a rate equal to the frequency of the alternating current energizing the magnet 3. As armature 8 is de-energized in each cycle, the vibrator arm is moved back to its normal position by the spring action of arm 4. A screw 26, which is shown extending through the frame 1 and contacting the arm 4 under the pickup mechanism 6, is used to adjust the distance between the right extremity of vibrator arm 7 and the armature 8 of the magnet.

The vibrations as set up by the arm 7 in the pickup mechanism 6 are transmitted through stud 19 to the work 22, causing it to rotate in one direction or the other until its major inside diameter is in line with a vertical axis through the stylus 23. The stylus 23, which has been moved upward in Figure 1 by placing the work in the position as shown, causes a displacement of the armature 14 in the pickup mechanism from its electrical center within coils 15, 16 and 17. The resulting indication on the electronic voltmeter, shown in block form in Figure 4, is a measurement of the smallest voltage differential set up between pickup coils 15 and 16, as the stylus ball 23 contacts the major inside diameter of the rotated work 22.

Figure 6:
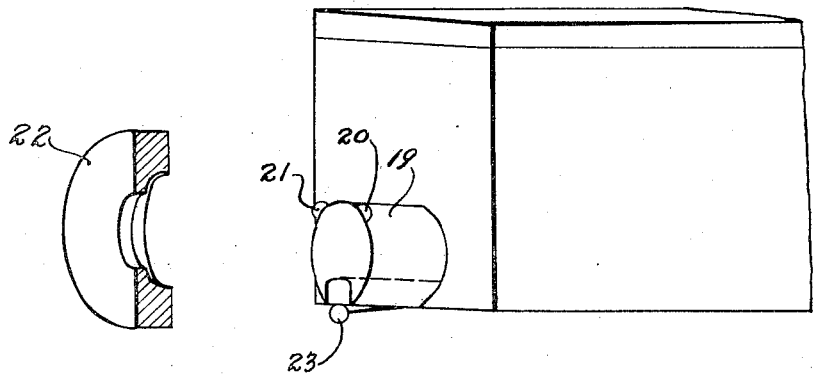
Figure 6 is a sectional view in pictorial representation of the work located in close proximity with the measuring instrument, a portion of which is also shown in pictorial representation.

Figure 6 is shown to give a clearer understanding of the positions of work holders 20 and 21 on stud 19 with respect to stylus 23. The work 22, in this particular case a ball bearing race, is shown sectioned in Figure 6 to illustrate a particular type of work to which this measuring instrument is suited.

The voltmeter scale is calibrated so that a mid-scale reading is zero with plus and minus readings in tenths of thousandths of an inch on either side of the zero reading. The zero reading is actually a reference reading which corresponds to the voltage differential setup between pickup coils 15 and 16 by displacement of armature 14 from its electrical center as a piece of work of true, desired inside diameter is placed in position as in Figure 1 on workholders 20 and 21 and stylus 23. Thus, when a piece of work, having a major inside diameter less than the inside diameter of a piece of work of the desired or reference diameter, is placed in the position for measurement, a reading greater than zero is obtained from the voltmeter. This positive reading is obtained due to the fact that the armature 14 is displaced further by the smaller than reference inside diameter of the work, causing a larger differential between the voltages induced in the pickup coils 15 and 16. In a similar manner, if a piece of work, having a major inside diameter greater than the desired or reference diameter, is placed in the position for measurement, a reading less than zero is indicated on the voltmeter. This is due to the existence of a smaller voltage differential between the pickup coils 15 and 16 than would exist if work of the reference or desired inside diameter were being measured.

This invention, therefore, provides a quick and precise method of classifying circular work such as ball bearing races into various tolerance groups such as true and plus or minus, one to ten or more tenths of thousandths of an inch.

I claim:

1. An electrical measuring instrument to measure inside diameters of circularly curved surfaces comprising a casing, a spring arm mounted fixedly at one end to said casing, a displacement pickup mechanism, having a stylus arm with a ball point, mounted on the free end of said spring arm, a stud member integral with said pickup mechanism extending beyond the end of the casing an amount equal to the length of the stylus arm of the pickup mechanism, a plurality of ball work holders mounted on said stud in a vertical plane through the stylus ball at the end of the stylus arm, a vibrator arm fixedly attached to the displacement pickup mechanism and having its free end extending parallel to the spring arm to a point over the fixed end of said spring arm, an electromagnet mounted on the fixed end of the spring arm between said spring arm and the free end of the vibrator arm, and a push button control switch mounted on the casing.

2. A measuring instrument comprising means for firmly supporting the elements of the instrument, means for flexibly mounting a measuring device within said supporting means, work holding means fixedly associated with the flexible mounting means for the measuring device, means to cause said work holding means to vibrate, and means to control the operation of said vibrating means.

3. An electrical measuring instrument comprising a base supporting means, displacement pickup mechanism means for measuring diameters of circularly curved surfaces, work holding means fixedly associated with said displacement pickup measuring means, flexible spring arm means, fixed at one end to the base supporting means, for supporting the displacement pickup measuring means at its free end, electromagnet vibrator means, mounted on the fixed end of said spring arm means, associated with a vibrator arm means, fixed to said displacement pickup measuring means at one end and having its free end in close proximity with said vibrator means for causing vibrations to be set up in said measuring means, and push button switch means mounted on a portion of said base supporting means for controlling the energization of said electromagnet vibrator means.

4. In an electrical measuring instrument for locating and measuring the major diameter of circularly curved work, base means to support the elements of the instrument, displacement pickup mechanism means to locate and measure the major diameter of the work and to help hold the work firmly during measurement, work holding means, fixedly associated with said displacement pickup measuring means, to hold the work during measurement, vibrator arm means, rigidly fixed to the displacement pickup measuring means at one end, to cause said means to vibrate along with said vibrator arm, flexible spring arm means, fixed to the base supporting means at one end, to carry the displacement pickup measuring means on its free end and to oppose the movement of said displacement pickup measuring means by said vibrator arm means, electromagnet means to cause said vibrator arm means to vibrate against the action of said flexible spring arm means, push button switch means to control the operation of said electromagnet means, and means responsive to the vibrations set up in the displacement pickup measuring means and the work holding means by said vibrator arm means and said electromagnet means, to cause the work on said work holding means to be rotated until the major diameter of said work is aligned for measurement by said pickup measuring means.

5. In an electrical instrument for locating and measuring the major inside diameter of circularly curved work, displacement pickup means to transmit impulses caused by displacement of an armature in said means to a linearly calibrated voltage indicating device, stylus arm means in said displacement pickup means to contact and hold the work under the spring action of said stylus arm, work holding means fixedly associated with said pickup means and located in a plane approximately perpendicular to the stylus arm means through the work contacting point of said stylus arm means, to contact the inner surface of the work at two or more places and thereby hold it steady in its position for measurment, electromagnet means to cause displacement pickup means and said work holding means to vibrate, and means responsive to the vibrations set up in said displacement pickup means and said work holding means to cause the work to rotate until the stylus arm means contacts and measures the major inside diameter of the work.

6. In an electrical instrument for measuring the inside diameters of circularly curved surfaces, means for firmly supporting the elements of said instrument, a measuring device and means for flexibly mounting the same within said supporting means, work holding means fixedly associated with said flexible mounting means, said measuring device including an electromagnetic vibrator means, displacement pickup mechanism including an armature and a stylus arm for controlling the movement of the armature, a ball stylus on the end of the stylus arm for contacting the work surface, a driving coil mounted about the movable armature and a pair of electrically opposed pickup coils mounted about the movable armature one on either side of said driving coil and substantially coextensive therewith for receiving induced voltages from said driving coil as said armature is physically moved longitudinally through said coils in displacement with respect thereto.

7. In an electrical instrument for measuring the inside diameters of circularly curved surfaces, means for firmly supporting the elements of said instrument, a measuring device and means for flexibly mounting the same within said supporting means, work holding means fixedly associated with said flexible mounting means, said measuring device including an electromagnetic vibrator means, displacement pickup mechanism including an armature and a stylus arm for controlling the movement of the armature, a ball stylus on the end of the stylus arm for contacting the work surface, a driving coil mounted about the movable armature and a pair of electrically opposed pickup coils mounted about the movable armature one on either side of said driving coil and substantially coextensive therewith for receiving induced voltages from said driving coil as said armature is physically moved longitudinally through said coils in displacement with respect thereto, and manually operable electrical control means for controlling the energization and operation of said electromagnetic vibrator means.

JOSEPH J. NEFF.